(12) United States Patent
Houston (10) Patent No.: US 10,348,204 B2
(45) Date of Patent: Jul. 9, 2019

(54) ENHANCED POWER MODE TRANSISTIONS IN BUCK-BOOST CONVERTERS

(71) Applicant: Intersil Americas LLC, Milpitas, CA (US)

(72) Inventor: Michael Jason Houston, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 15/878,226

(22) Filed: Jan. 23, 2018

(65) Prior Publication Data

US 2018/0166992 A1   Jun. 14, 2018

Related U.S. Application Data

(63) Continuation of application No. 15/078,841, filed on Mar. 23, 2016, now Pat. No. 9,882,488.

(60) Provisional application No. 62/218,325, filed on Sep. 14, 2015, provisional application No. 62/274,533, filed on Jan. 4, 2016, provisional application No. 62/309,899, filed on Mar. 17, 2016.

(51) Int. Cl.
*H02M 3/158*   (2006.01)

(52) U.S. Cl.
CPC .................. *H02M 3/1582* (2013.01)

(58) Field of Classification Search
CPC .................................................. H02M 3/1582
See application file for complete search history.

(56) References Cited

U.S. PATENT DOCUMENTS

| | | | | |
|---|---|---|---|---|
| 6,166,527 | A * | 12/2000 | Dwelley | H02M 3/1582 323/222 |
| 7,391,190 | B1 | 6/2008 | Rajagopalan | |
| 7,453,247 | B2 | 11/2008 | De Cremoux | |
| 7,737,668 | B2 * | 6/2010 | Oswald | H02M 3/1582 323/259 |
| 7,843,177 | B2 | 11/2010 | Ho et al. | |

(Continued)

OTHER PUBLICATIONS

Lee et al., "A Compensation Technique for Smooth Transitions in a Noninverting Buck-Boost Converter", "IEEE Transactions on Power Electronics, Apr. 2009",, pp. 1002-1016, vol. 24, No. 4, Publisher: IEEE.

(Continued)

*Primary Examiner* — Gary L Laxton
*Assistant Examiner* — Sisay G Tiku
(74) *Attorney, Agent, or Firm* — Foley & Lardner LLP (57) ABSTRACT

An electronic system, DC-DC voltage converter, method of operating a buck-boost DC-DC converter, and method for power mode transitioning in a DC-DC voltage converter are disclosed. For example, one method includes receiving a compensated error signal associated with an output voltage of the DC-DC voltage converter, determining a power mode of operation of the DC-DC voltage converter, and if the power mode of operation is a first mode, outputting a first control signal to regulate the output voltage of the DC-DC voltage converter. If the power mode of operation is a second mode, outputting a second control signal to regulate the output voltage of the DC-DC voltage converter, and if the power mode of operation is a third mode, outputting a third control signal to regulate the output voltage of the DC-DC voltage converter.

18 Claims, 8 Drawing Sheets

(56) References Cited

U.S. PATENT DOCUMENTS

| | | | |
|---|---|---|---|
| 8,018,212 B1 | 9/2011 | Petricek | |
| 8,305,055 B2 | 11/2012 | Wu et al. | |
| 8,860,387 B2 * | 10/2014 | Kobayashi | H02M 3/1582 |
| | | | 323/259 |
| 9,041,363 B2 * | 5/2015 | Tanabe | H02M 3/1582 |
| | | | 323/259 |
| 9,705,401 B2 * | 7/2017 | Cho | H02M 3/1563 |
| 9,893,623 B2 * | 2/2018 | Tanabe | H02M 3/1582 |
| 2006/0284606 A1 | 12/2006 | Chen et al. | |
| 2008/0001587 A1 * | 1/2008 | Cremoux | H02M 3/1582 |
| | | | 323/282 |
| 2009/0102440 A1 | 4/2009 | Coles | |
| 2010/0231189 A1 | 9/2010 | Chen et al. | |
| 2011/0187336 A1 | 8/2011 | Wu et al. | |
| 2012/0032658 A1 | 2/2012 | Casey et al. | |
| 2012/0146602 A1 | 6/2012 | Chen et al. | |
| 2016/0099640 A1 | 4/2016 | Cho et al. | |
| 2017/0005577 A1 | 1/2017 | Chen | |
| 2017/0040898 A1 * | 2/2017 | Hong | H02M 3/1582 |

OTHER PUBLICATIONS

Redl et al., "Near-Optimum Dynamic Regulation of DC-DC Converters Using Feed-Forward of Output Current and Input Voltage with Current-Mode Control", "IEEE Transactions on Power Electronics, Jul. 1986",, pp. 181-192, vol. PE-1, No. 3, Publisher: IEEE.

\* cited by examiner

ENHANCED POWER MODE TRANSISTIONS IN BUCK-BOOST CONVERTERS

CROSS-REFERENCE TO RELATED APPLICATIONS

The present application is a continuation of U.S. patent application Ser. No. 15/078,841, filed Mar. 23, 2016, now U.S. Pat. No. 9,882,488, and also claims the benefit of U.S. Provisional Patent Application Ser. No. 62/218,325, filed on Sep. 14, 2015 U.S. Provisional Patent Application Ser. No. 62/274,533, filed on Jan. 4, 2016 and U.S. Provisional Patent Application Ser. No. 62/309,899, filed on Mar. 17, 2016, all such applications being incorporated herein by reference in their entirety.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings.

DETAILED DESCRIPTION

In the following detailed description, reference is made to the accompanying drawings that form a part hereof, and in which are shown by way of specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense. Wherever possible, the same or like reference numbers are used throughout the drawings to refer to the same or like structural components or parts.

A buck-boost converter is a DC-to-DC voltage converter that steps down the input voltage in the buck mode of operation, steps up the input voltage in the boost mode, and steps up or down the input voltage in the buck-boost mode. The ratio of the output voltage to the input voltage is utilized to determine the power mode of operation. Thus, the buck-boost converter generates a regulated DC output voltage having a magnitude that is less than (buck mode), greater than (boost mode), or less than, greater than, or equal to (buck-boost mode) the magnitude of the input voltage. Buck-boost converters are utilized in many applications in which the input voltage can vary widely, such as for example, in battery powered systems and the like.

A problem with existing buck-boost converters is that the associated controllers have to be capable of efficiently regulating the output voltage in the buck, buck-boost and boost power modes of operation, but the process of changing the modes causes significant disturbances to the input and output voltages and currents as the mode transitions occur. These disturbances can lead to power mode chatter near the power mode boundaries and poor voltage and current regulation as a result. Specifically, during a mode change when the regulator stage in the buck-boost converter is transitioning from the buck-boost mode to either the buck mode or the boost mode, the inductor current in the buck-boost converter has to decrease to maintain regulation. However, in a current-mode control implementation, the inductor current is proportional to the control voltage. Consequently, the control voltage also has to decrease. The abrupt change in the power mode and delayed response of the control voltage and inductor current lead to large disturbances in the loop of the buck-boost converter, and the efficiency of the converter's voltage and current regulation is significantly decreased as a result. Nevertheless, as described below, the present invention resolves these and other, related problems with enhanced power mode transitions in buck-boost converters utilized in DC-to-DC voltage converters or controllers formed on integrated circuits, wafers, chips or dies.

Figure 1:
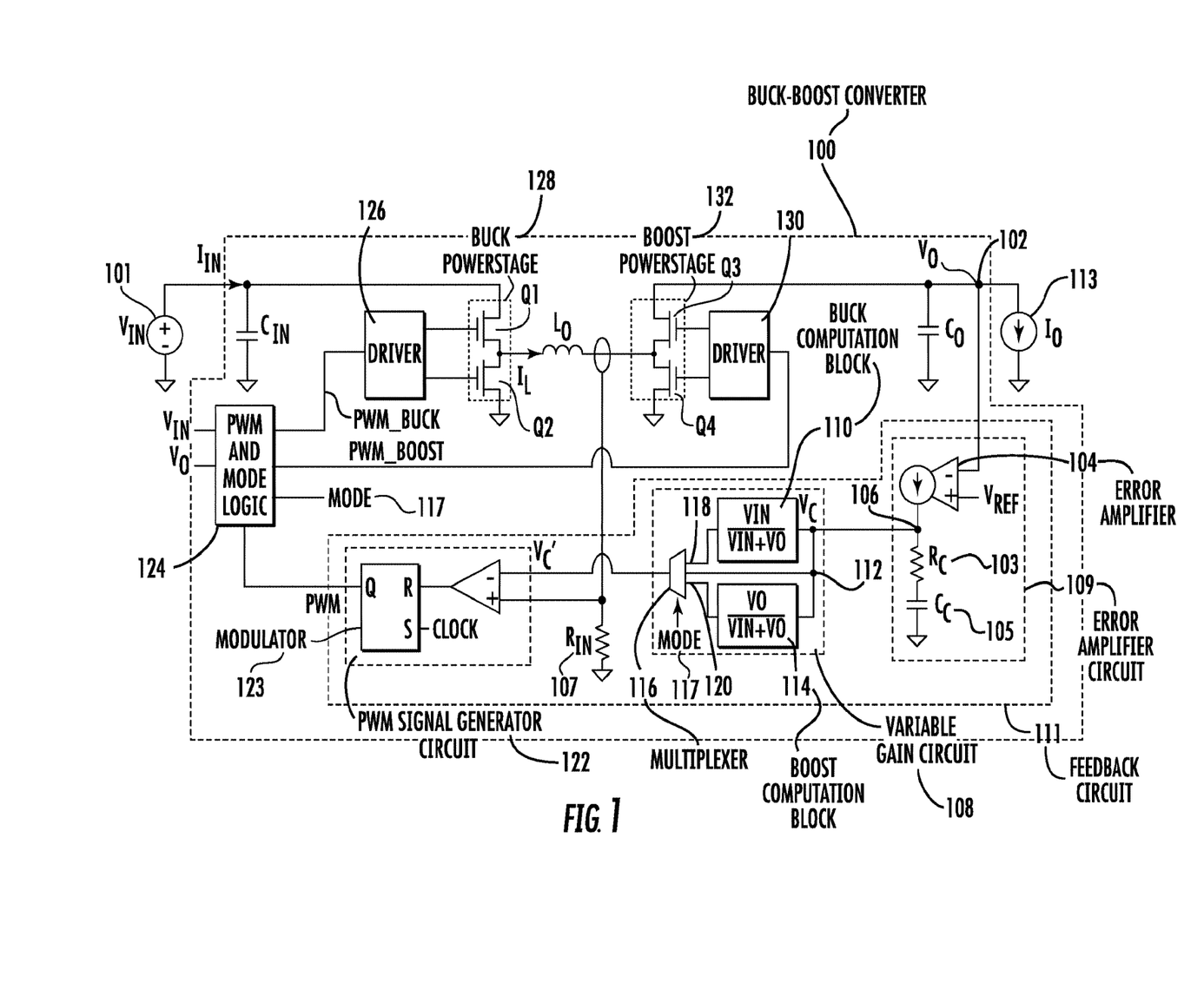
FIG. 1 depicts a schematic circuit diagram of a buck-boost converter, which can be utilized to implement one exemplary embodiment of the present invention.

FIG. 1 depicts a schematic circuit diagram of a buck-boost converter 100, which can be utilized to implement one exemplary embodiment of the present invention. In the exemplary embodiment shown, the buck-boost converter 100 is operating in current-mode control. The exemplary buck-boost converter 100 depicted in FIG. 1 includes a buck power stage 128, a boost power stage 132, and a transconductance-type error amplifier circuit 109 coupled to an output of the boost power stage 132. In this embodiment, the transconductance-type error amplifier circuit 109 includes an error amplifier 104, and frequency compensation components resistor $R_C$ 103 and capacitor $C_C$ 105 connected to circuit ground. A variable gain circuit 108 is coupled to an output 106 of the error amplifier 104, and a pulse-width modulation (PWM) signal generator circuit 122 is coupled to an output of the variable gain circuit 108 and an output of the buck power stage 128. In some embodiments, a buffer amplifier (with a gain that can be unity) can be coupled between the output 106 of the error amplifier 104 and the input 112 of the variable gain circuit 108. A PWM and mode logic circuit 124 (also referred to as logic circuit 124) is coupled to the PWM signal generator circuit 122, and a first switching transistor driver circuit 126 is coupled to the PWM and mode logic circuit 124 and a first pair of switching transistors Q1, Q2 in the buck power stage 128. A second switching transistor driver circuit 130 is coupled to the PWM and mode logic circuit 124 and a second pair of switching transistors Q3, Q4 in the boost power stage 132.

More precisely, the buck-boost converter 100 is coupled to a voltage source 101, which generates an input voltage, $V_{IN}$, and input current, $I_{IN}$. The input current, $I_{IN}$, charges an input capacitor, $C_{IN}$, and develops the input voltage, $V_{IN}$, across the input capacitor, $C_{IN}$. The input voltage, $V_{IN}$, is coupled to the drain terminal of the first switching transistor, Q1. A first output terminal of the first switching transistor driver circuit 126 is coupled to the control or gate terminal of the first switching transistor Q1, and a second output terminal of the first switching transistor driver circuit 126 is coupled to the control or gate terminal of the second switching transistor Q2. The source terminal of the first switching transistor Q1 is coupled to the drain terminal of the second switching transistor Q2, and the source of the second switching transistor Q2 is coupled to circuit ground. The node between the source terminal of the first switching transistor Q1 and drain terminal of the second switching transistor Q2 is coupled to a first end of the inductor $L_O$ at the output of the buck power stage 128. In the buck mode of operation, responsive to the ratio of the output voltage, $V_O$, to the input voltage, $V_{IN}$, at the two inputs of the PWM and mode logic circuit 124, the PWM_BUCK signal is output from the PWM and mode logic circuit 124, and the first switching transistor driver circuit 126 drives the first and second switching transistors Q1, Q2 to generate the inductor current $I_L$ through the output inductor, $L_O$.

The second end of the inductor $L_O$ is coupled to a node connected between the source terminal of the third switching transistor Q3 and the drain terminal of the fourth switching transistor Q4 in the boost power stage 132. The source of the fourth switching transistor Q4 is coupled to circuit ground. One output of the second switching transistor driver circuit 130 is coupled to the control or gate terminal of the third switching transistor Q3, and the second output of the second switching transistor driver circuit 130 is coupled to the control or gate terminal of the fourth switching transistor Q4. The drain terminal of the third switching transistor Q3 is coupled to the output capacitor, $C_O$, and the output node 102. In the boost mode of operation, responsive to the ratio of the output voltage, $V_O$, to the input voltage, $V_{IN}$, at the two inputs of the PWM and mode logic circuit 124, the PWM_BOOST signal is output from the PWM and mode logic circuit 124, and the second switching transistor driver circuit 130 drives the third and fourth switching transistors Q3, Q4 of the boost power stage 132 to generate the output voltage, $V_O$, and the output current, $I_O$ 113, at the output node 102 of the buck-boost converter 100. During the boost mode of operation, the PWM and mode logic circuit 124 utilizes the first switching transistor driver circuit 126 to keep the first switching transistor Q1 on and the second switching transistor Q2 off.

For this exemplary embodiment, a feedback circuit 111 is coupled between the output node 102 and PWM and logic circuit 124. The feedback circuit 111 modifies an error signal responsive to a transition between power modes. Specifically, in the feedback circuit, the output voltage, $V_O$, of the boost power stage 132 is coupled from the output node 102 to the inverting input of the error amplifier 104 in the transconductance-type error amplifier circuit 109. In this embodiment, an operational transconductance amplifier (OTA) is configured to function as the error amplifier 104. In a second exemplary embodiment, an operational amplifier (OA) could be configured to output an error voltage signal and thereby function as the error amplifier 104. A reference voltage, $V_{REF}$, is coupled to the non-inverting input of the error amplifier 104. The current generated at the output of the error amplifier 104 flows through frequency compensation components resistor $R_C$ 103 and capacitor $C_C$ 105 to circuit ground, and develops a compensated error signal, $V_C$, at the output 106. The compensated error signal, $V_C$, is coupled from the output 106 to a variable gain circuit 108, which functions to compute and output a unique control signal, $V_C'$, e.g., a modified compensated error signal, for each of the buck, buck-boost and boost modes based on the input voltage ($V_{IN}$) and output voltage ($V_O$) operating point. Thus, the control signal, $V_C'$, is pre-positioned to the level required to drive the inductor, $L_O$, to the correct inductor current ($I_L$) value as quickly as possible after the mode is changed, and with only a minimal change to the original control signal, $V_C$. Therefore, as a result, any disturbance to the regulator's state variables is minimized whenever a power mode transition occurs.

Specifically, referring to the variable gain circuit 108, the control signal, $V_C$, at output 106 is coupled to a respective input of a buck computation block 110, an input 112 of a multiplexer 116, and a boost computation block 114. For this exemplary embodiment, each one of the buck computation block 110 and the boost computation block 114 can be implemented utilizing suitable analog circuitry configured to perform the computations involved, such as, for example, one or more voltage dividers and one or more voltage adders or summers. In other embodiments, the computations performed by the buck computation block 110 and the boost computation block 114 can be accomplished digitally, or alternatively, by combining analog and digital methods. For some embodiments, the computations performed by each of the buck computation block 110 and the boost computation block 114 can be accomplished, for example, by determining and applying a scaling factor to the compensated error voltage, wherein the specific scaling factor applied is determined based on the power mode of operation of the buck-boost converter. In any event, the output of the buck computation block 110 is coupled to a second input 118 of the multiplexer 116, and the output of the boost computation block 114 is coupled to a third input 120 of the multiplexer 116. A control signal MODE 117 is utilized to control the switching operation of the multiplexer 116. The MODE control output 117 of the PWM and mode logic circuit 124 is also the MODE control input 117 to the multiplexer 116. Thus, the PWM and mode logic circuit 124 is configured to control which signal is coupled from the variable gain circuit 108 to the PWM signal generator circuit 122. For the exemplary embodiment shown in FIG. 1, the ratio of the output voltage, $V_O$, to the input voltage, $V_{IN}$, is utilized to determine the power mode of operation for the buck-boost converter 100, and this ratio is also utilized to control the switching of the multiplexer 116 via the control signal MODE 117. For example, if the magnitude of the regulated DC output voltage of the buck-boost converter becomes less than the magnitude of the input voltage, the PWM and mode logic circuit 124 outputs the control signal MODE 117 to switch the multiplexer 116 to the buck mode. If the magnitude of the regulated DC output voltage of the buck-boost converter becomes greater than the magnitude of the input voltage, the PWM and mode logic circuit 124 outputs the control signal MODE 117 to switch the multiplexer 116 to the boost mode of operation. If the magnitude of the regulated DC output voltage of the buck-boost converter becomes substantially equal to the magnitude of the input voltage, the PWM and mode logic circuit 124 outputs the control signal MODE 117 to switch the multiplexer 116 to the buck-boost mode of operation.

Figure 2:
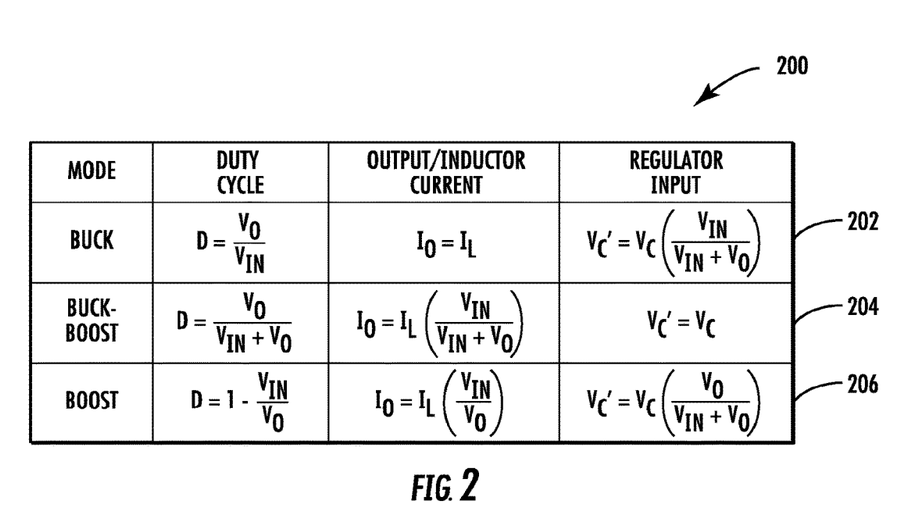
FIG. 2 is a table depicting exemplary operating parameters for the buck-boost converter shown in FIG. 1.

FIG. 2 is a table 200 depicting exemplary operating parameters for the buck-boost converter 100 shown in FIG. 1. Referring to the buck-boost converter 100 in FIG. 1 and the table 200 shown in FIG. 2, in an exemplary operation, if the control signal MODE 117 from the PWM and mode logic circuit 124 switches the multiplexer 116 to the buck mode, as indicated at 202, the signal at the output of the multiplexer 116 is the control signal, $V_C'$, which in the buck mode can be expressed as:

$$V_C' = V_C \left( \frac{V_{IN}}{V_{IN} + V_O} \right) \quad (1)$$

Alternatively, as indicated at 204, if the control signal MODE 117 from the PWM and mode logic circuit 124 switches the multiplexer 116 to the buck-boost mode, the signal at the output of the multiplexer 116 is the error signal, $V_C$, because the error signal, $V_C$, is coupled directly from the output 106 to the multiplexer 116 in the buck-boost mode. As such, when the buck-boost converter 100 transitions to the buck-boost mode, the signal at the output of the multiplexer 116 is the control signal, $V_C'$, which in this mode can be expressed as:

$$V_C' = V_C \quad (2)$$

Additionally, as indicated at 206, if the control signal MODE 117 from the PWM and mode logic circuit 124 switches the multiplexer 116 to the boost mode, the signal at the output of the multiplexer 116 is the control signal, $V_C'$, which in this mode can be expressed as:

$$V_C' = V_C \left( \frac{V_O}{V_{IN} + V_O} \right) \quad (3)$$

Note that the table 200 also indicates the duty cycle and output/inductor current relationship that determines the DC voltage and current operating point for each one of the buck, buck-boost and boost modes of operation of the buck-boost converter 100.

The pre-positioned control signal, $V_C'$, is coupled from the variable gain circuit 108 to the PWM signal generator circuit 122. The PWM signal generator circuit 122 outputs a PWM signal to the PWM and Mode Logic circuit 124, which generates the control signal MODE 117 in response to the ratio of the output voltage, $V_O$, to the input voltage, $V_{IN}$. As described above, the PWM and Mode Logic circuit 124 also outputs the PWM_BUCK signal utilized to modulate the first switching transistor driver circuitry 126 for the switching transistors Q1, Q2 to generate the inductor current, $I_L$, in the buck power stage 128, and also outputs the PWM_BOOST signal that is utilized to modulate the second switching transistor driver circuitry 130 for the switching transistors Q3, Q4 to generate the output voltage, $V_O$, in the boost power stage 132. As described above, during the boost mode of operation, the PWM and Mode Logic circuit 124 keeps the first switching transistor Q1 on and the second switching transistor Q2 off. During the buck mode of operation, the PWM and Mode Logic circuit 124 keeps the third switching transistor Q3 on and the fourth switching transistor Q4 off.

Figure 3A:
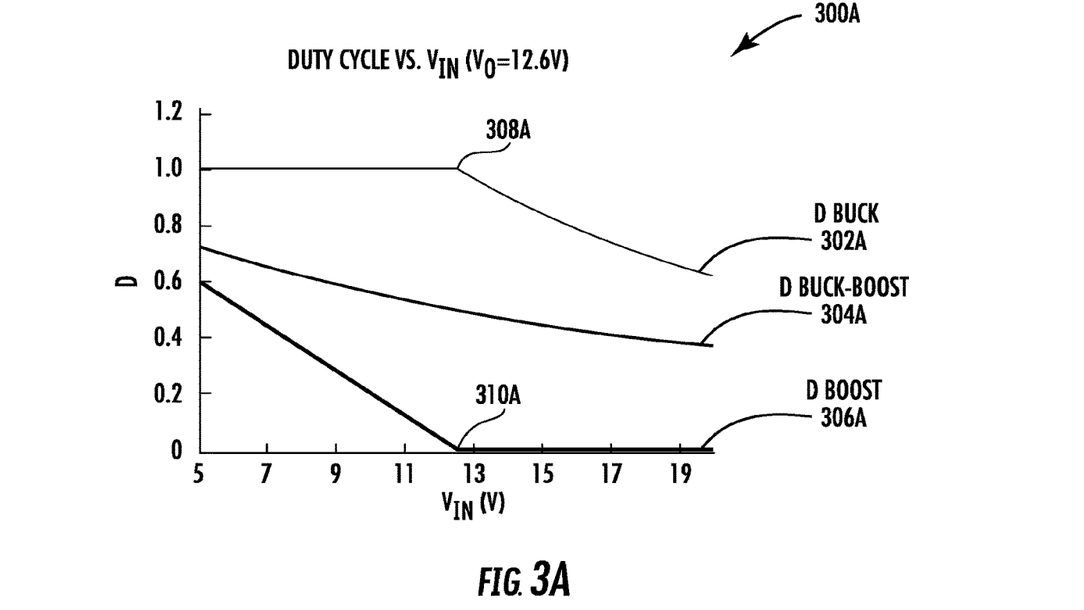
FIGS. 3A-3B are related waveform diagrams depicting exemplary DC operating curves for the buck, buck-boost and boost power modes of operation of the buck-boost converter shown in FIG. 1.
Figure 3B:
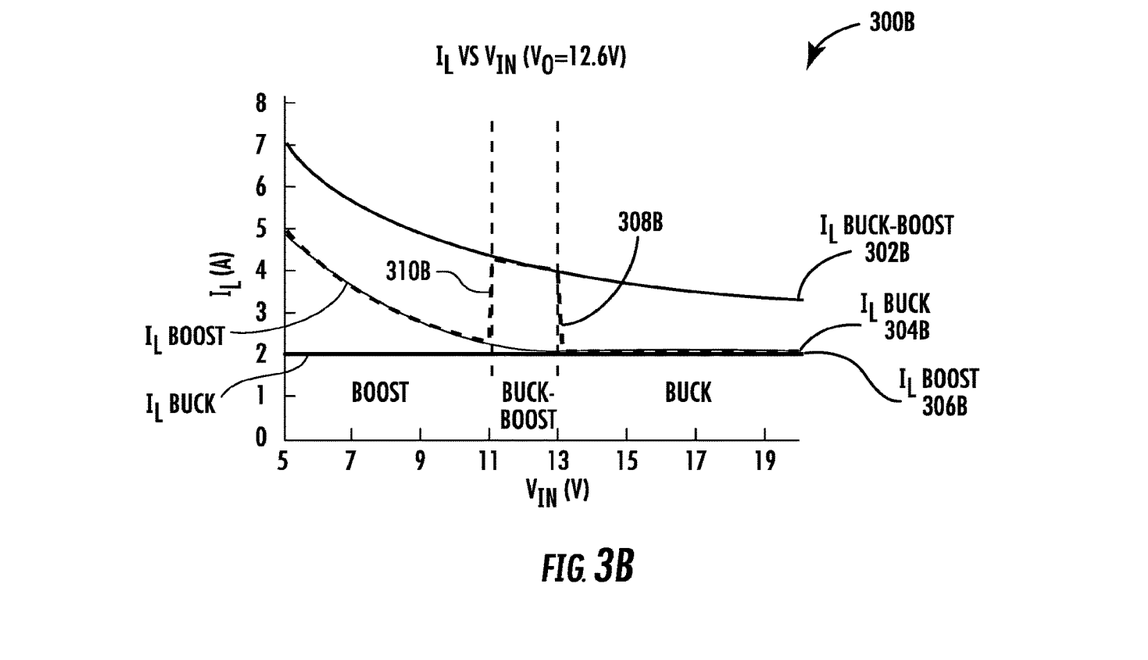

FIGS. 3A-3B are related waveform diagrams depicting exemplary DC operating curves for buck, buck-boost and boost power modes of operation of the buck-boost converter 100 shown in FIG. 1. For example, referring also to FIG. 2, the table 200 shows the duty cycle and output/inductor current relationship for the buck mode of operation at 202, the buck-boost mode of operation at 204, and the boost mode of operation at 206. Referring to FIG. 3A, the diagram 300A depicts exemplary operating curves resulting from the duty cycle computations shown in the table 200 for the duty cycle, D, versus the input voltage, $V_{IN}$, with the output voltage, $V_O$, selected to be 12.6V for the buck mode at 302A, the buck-boost mode at 304A, and the boost mode at 306A. Notably, the curvature of the duty cycle operating curve 302A in the buck mode remains constant and undisturbed until the input voltage, $V_{IN}$, and the output voltage, $V_O$, are equal, as indicated at 308A. Similarly, the curvature of the duty cycle operating curve 304A in the buck-boost mode remains substantially constant and undisturbed throughout the entire operation. Also, the curvature of the duty cycle operating curve 306A also remains constant and undisturbed until the input voltage, $V_{IN}$, and the output voltage, $V_O$, are equal, as indicated at 310A. Thus, the waveforms depicted in FIG. 3A show that there are no abrupt changes to the duty cycles for the buck, buck-boost and boost power modes of operation of the exemplary buck-boost converter 100 shown in FIG. 1 while the input voltages are increased to the level of the output voltage in the buck-boost converter shown in FIG. 1.

The waveform diagram 300B in FIG. 3B depicts exemplary operating curves resulting from the output/inductor current relationships shown in the table 200 for the inductor current, $I_L$, versus the input voltage, $V_{IN}$, with the output voltage, $V_O$, selected to be 12.6V for the buck-boost mode at 302B, the buck mode at 304B, and the boost mode at 306B. The dashed line 308B indicates how the steady-state inductor current changes when the buck-boost converter 100 depicted in FIG. 1 transitions between the boost, buck-boost and buck power modes of operation. The dashed line 308B also indicates the power mode operating range centered at an output voltage, $V_O$, of 12.6V. Notably, as indicated at 308B and 310B, the transition to the correct inductor current ($I_L$) value occurs as quickly as possible after the mode is changed (e.g., with only a minimal change to the original control signal, $V_C$). Thus, the waveforms depicted in FIG. 3B show that disturbances to the state variables for the regulator stage in the buck-boost converter 100 depicted in FIG. 1 are minimized whenever a mode transition occurs (e.g., at 308B and 310B). It is noted that the waveforms shown in FIGS. 3A, 3B and the equations shown in FIG. 2 assume that the exemplary embodiment of the buck-boost converter 100 shown in FIG. 1 is operating in a continuous inductor current mode (CCM).

Figure 4A:
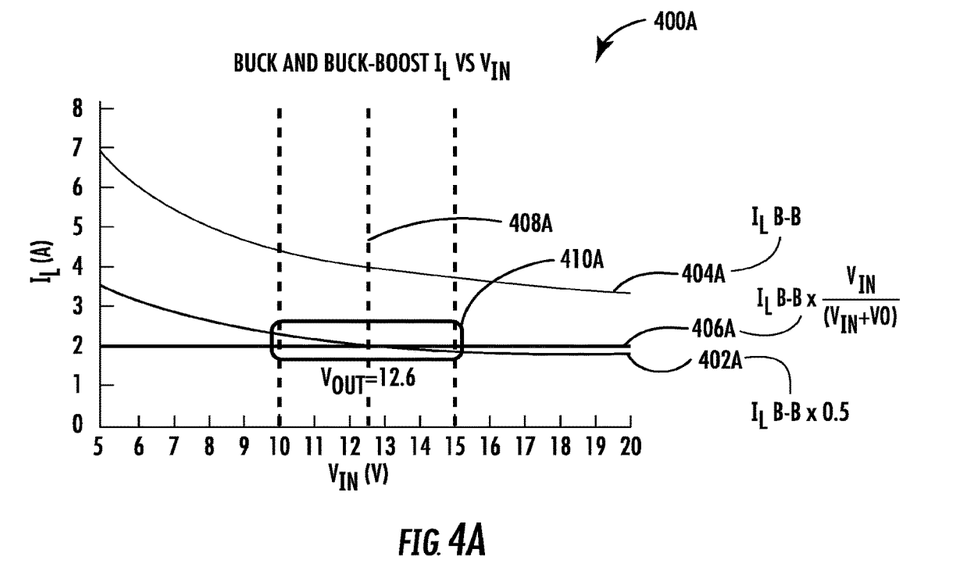
FIGS. 4A-4B are related waveform diagrams depicting waveform approximations of the buck, buck-boost and boost inductor current versus the input voltage for the buck-boost converter shown in FIG. 1.
Figure 4B:
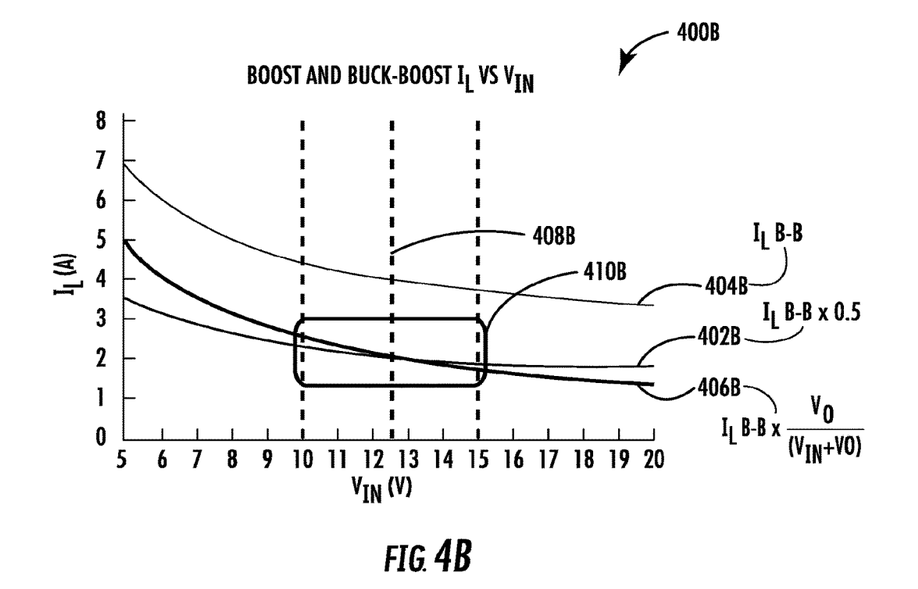

FIGS. 4A-4B are related diagrams depicting waveform approximations of the buck, buck-boost and boost inductor current, $I_L$, versus the input voltage, $V_{IN}$, utilizing the value of $V_C'=0.5 \times V_C$ for the buck-boost converter 100 shown in FIG. 1. Referring to the waveform 400A in FIG. 4A, the buck and buck-boost inductor current versus the input voltage waveform curves are shown. Specifically, the waveform curve 404A indicates the buck-boost inductor current, $I_L$. The waveform curve 406A indicates the buck-boost inductor current, $I_L$, multiplied by $V_{IN}/(V_{IN}+V_O)$. The waveform curve 402A indicates the buck-boost current, $I_L$, multiplied by 0.5. At 408A, the output voltage, $V_O$, is 12.6V. As indicated at 410A, the rectangle shows that the selection of $V_C'=V_C \times 0.5$ appears to be very close to the ideal computation for the buck mode of operation over a wide input/output range.

Referring to the waveform 400B in FIG. 4B, the boost and buck-boost inductor current versus the input voltage waveform curves are shown. The waveform curve 404B indicates the buck-boost inductor current $I_L$. The waveform curve 406B indicates the buck-boost inductor current, $I_L$, multiplied by $V_O/(V_{IN}+V_O)$. The waveform curve 402B indicates the buck-boost current, $I_L$, multiplied by 0.5. At 408B, the output voltage, $V_O$, is 12.6V. As indicated at 410B, the rectangle shows that the selection of $V_C'=V_C \times 0.5$ for the buck-boost converter 100 depicted in FIG. 1 also appears to be very close to the ideal computation for the boost mode of operation over a wide input/output range.

Figure 5:
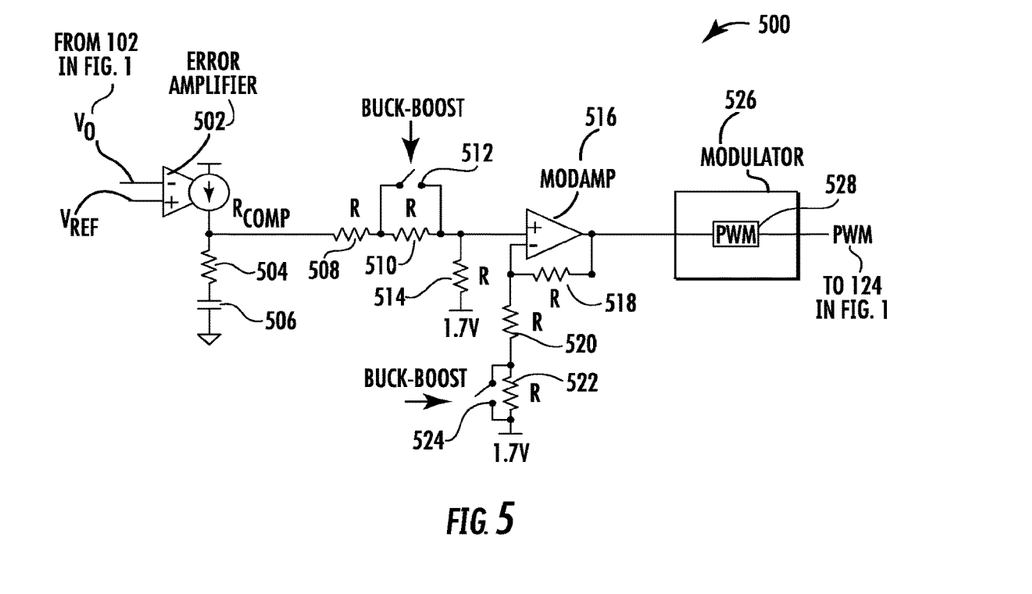
FIG. 5 depicts a schematic circuit diagram of feedback circuitry that can be utilized to control a buck-boost converter, in accordance with a second exemplary embodiment of the present invention.

FIG. 5 depicts a schematic circuit diagram of feedback circuitry 500 that can be utilized to control a buck-boost converter, in accordance with a second exemplary embodiment of the present invention. For example, in one embodiment, the feedback circuitry 500 can be utilized in place of the variable gain circuit 108 and the PWM signal generator circuit 122 to control the buck-boost converter 100 depicted in FIG. 1. Referring to FIG. 5 for the exemplary embodiment shown, the feedback circuitry 500 includes an error amplifier 502 connected to a first resistor 504 and a second resistor 508. Notably, in one embodiment, the feedback circuitry 500 can also include a buffer amplifier coupled between the upper-most terminal of the first resistor 504 and the left-most terminal of the second resistor 508 to prevent the resistors 508, 510 and 514 from loading the error amplifier 502 and thereby reducing its gain. The output voltage, $V_O$, (e.g., from output node 102 in FIG. 1) is coupled to the inverting input of the error amplifier 502. The non-inverting input of the error amplifier 502 is connected to the reference voltage, $V_{REF}$. The first resistor 504 is connected to a capacitor 506, and the capacitor 506 is connected to circuit ground. In this embodiment, the error amplifier 502 is configured as an OTA, which generates a resistance value, $R_{COMP}$ that is added to the resistance value of the second resistor 508. The second resistor 508 is connected to a third resistor 510, which is connected to a fourth resistor 514 and the non-inverting input of an operational amplifier 516. A fifth resistor 518 is connected across the inverting input and the output of the operational amplifier 516. The inverting input of the operational amplifier 516 is also connected to one terminal of a sixth resistor 520, and the second terminal of the sixth resistor 520 is connected to one terminal of a seventh resistor 522. The second terminal of the seventh resistor 522 is connected to a bias voltage (e.g., 1.7V for this embodiment). In this embodiment, the operational amplifier 516 is configured to function as an amplifier stage (e.g., modulator amplifier) to amplify the voltage signal coupled to the PWM modulator 528 in the modulator circuit 526. The output of the modulator circuit 526 is a PWM signal (e.g., coupled to the PWM and Mode Logic circuit 124 in FIG. 1). A first switch 512 (e.g., semiconductor switch) is connected across the third resistor 510, and a second switch 524 is connected across the seventh resistor 522. The switch positions of the first and second switches 512, 524 are controlled by the control signal (BUCK-BOOST). In this embodiment, when the control signal is applied to the switches 512, 524, the switches 512, 524 are closed and the associated resistors 510, 522 are bypassed. Thus switches 512, 524 form a "switchable gain circuit" for operational amplifier 516.

In operation of the feedback circuitry 500, the output voltage, $V_O$, of the buck-boost converter is coupled to the inverting input of the error amplifier 502. The non-inverting input of the error amplifier 502 is connected to the reference voltage, $V_{REF}$. The compensation signal, $R_{COMP}$, generated at the output of the error amplifier 502 is coupled to the non-inverting input of the operational amplifier (MODAMP) 516. If the buck-boost control signal (BUCK-BOOST) is applied to one or both of the switches 512, 524, to bypass the respective resistor 510, 522 (e.g., in response to a power mode change), the DC level of the signal at the output of the operational amplifier 516 is changed accordingly. Thus, in accordance with the teachings of the present application, the compensation voltage at the input to the modulator circuit 526 is thereby pre-positioned to the level required to drive the inductor (e.g., $L_O$ in FIG. 1) in the associated buck-boost converter (e.g., 100 in FIG. 1) to the correct current value (e.g., $I_L$) as quickly as possible after the power mode of operation is changed.

Figure 6:
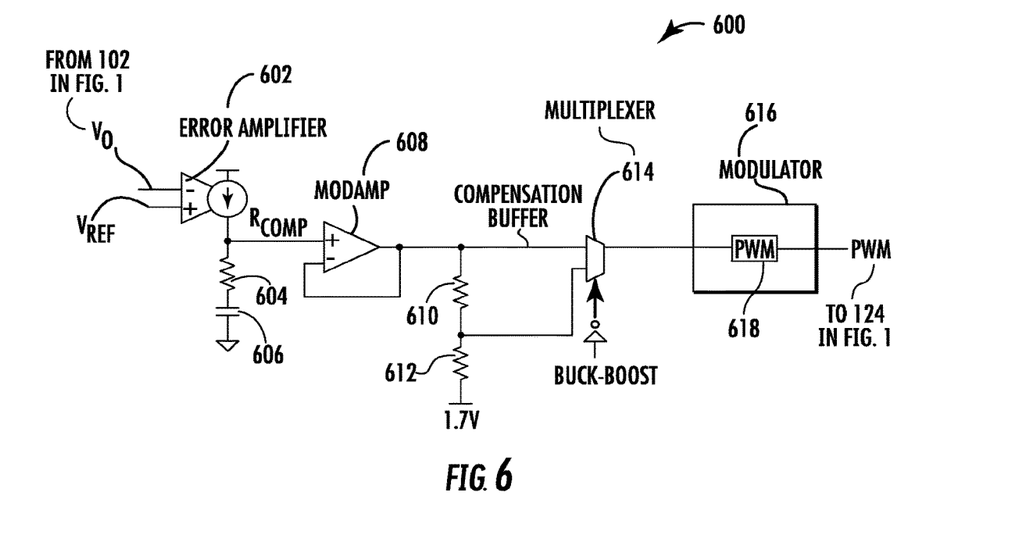
FIG. 6 depicts a schematic circuit diagram of feedback circuitry that can be utilized to control a buck-boost converter, in accordance with a third exemplary embodiment of the present invention.

FIG. 6 depicts a schematic circuit diagram of feedback circuitry 600 that can be utilized to control a buck-boost converter, in accordance with a third exemplary embodiment of the present invention. For example, in one embodiment, the feedback circuitry 600 can be utilized in place of the variable gain circuit 108 and the PWM signal generator circuit 122 to control the buck-boost converter 100 depicted in FIG. 1. Referring to FIG. 6 for the exemplary embodiment shown, the feedback circuitry 600 includes an error amplifier 602 connected to a first resistor 604 and the non-inverting input of a unity-gain buffer modulator amplifier (MODAMP) 608. The output voltage, $V_O$, of the buck-boost converter is coupled to the inverting input of the error amplifier 602. The non-inverting input of the error amplifier 602 is connected to the reference voltage, $V_{REF}$. The first resistor 604 is connected to a capacitor 606, and the capacitor 606 is connected to circuit ground. In this embodiment, the error amplifier 602 is configured as an OTA, which generates an output voltage, $R_{COMP}$ that is coupled to the non-inverting input of the modulation amplifier 608. The output of the modulation amplifier 608 is fed back and connected to its inverting input and to one input of a multiplexer 614. In this embodiment, the modulation amplifier 608 is configured to amplify the $R_{COMP}$ signal to be coupled to the PWM modulator 618 in the modulator circuit 616. The output of the modulator circuit 616 is a PWM signal (e.g., coupled to the PWM and Mode Logic circuit 124 in FIG. 1). The output of the modulation amplifier 608 is also connected to one terminal of a second resistor 610, which is connected to a terminal of a third resistor 612 to form a voltage divider. The second terminal of the third resistor 612 is coupled to a supply voltage (e.g., 1.7V for this embodiment). The node connected between the second resistor 610 and the third resistor 612 of the voltage divider is connected to the second input of the multiplexer 614. The multiplexing operations of the multiplexer 614 are controlled by the control signal (BUCK-BOOST). In this embodiment, when the control signal is applied to the multiplexer 614, the two inputs of the multiplexer 614 are multiplexed together and the resulting signal is output from the multiplexer 614 and coupled to the input of the modulator circuit 616. In this manner, multiplexer 614 functions as a switchable gain circuit for modulation amplifier 608.

In operation of the feedback circuitry 600, the signal representing the output voltage of the buck-boost converter, $V_O$, is coupled to the inverting input of the error amplifier circuit 602. The signal, $R_{COMP}$, which is generated at the output of the error amplifier 602, is coupled to the input of the modulator amplifier 608, and the amplified $R_{COMP}$ signal is coupled to the multiplexer 614. If the BUCK-BOOST control signal is applied to the control terminal of the multiplexer 614 (e.g., power mode change), the DC level of the multiplexed signal at the output of the multiplexer 614 is changed in accordance with the values of the resistors 610, 612. Thus, in accordance with the teachings of the present application, the (buffered) compensation voltage signal at the input to the modulator amplifier 608 is thereby prepositioned to the level needed to drive the inductor (e.g., $L_O$) in the buck-boost converter to the correct current value (e.g., $I_L$) as quickly as possible after the power mode of operation is changed.

Figure 7:
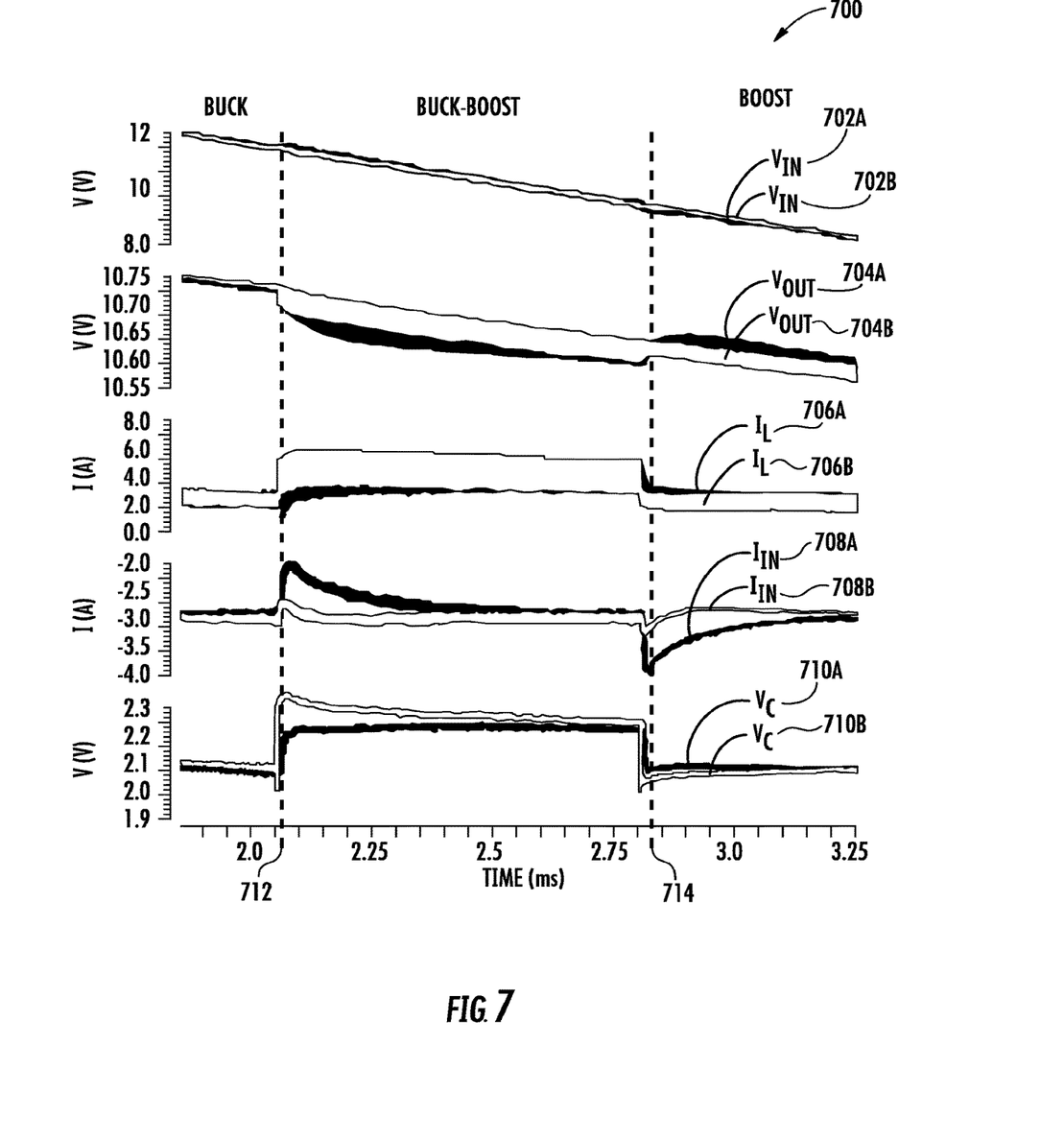
FIG. 7 is a waveform diagram depicting comparisons of the simulated performances of a buck-boost converter with and without enhanced power mode transitioning.

FIG. 7 is a waveform diagram 700 depicting comparisons of the simulated performances of a buck-boost converter with and without enhanced power mode transitioning. For example, in one embodiment, the waveforms depicting the buck-boost converter performance with enhanced power mode transitioning can be provided by the buck-boost converter 100 shown in FIG. 1. Referring to FIG. 7, transient analyses are utilized to depict the comparisons of the input voltages ($V_{IN}$), output voltages ($V_{OUT}$), inductor currents ($I_L$), input currents ($I_{IN}$), and compensation voltages ($V_C$) during transitions between power modes. Note that the lighter shaded waveforms in FIG. 7 (e.g., labeled 702B, 704B, etc.) are those for a buck-boost converter with enhanced power mode transitioning, and the darker shaded waveforms in FIG. 7 (e.g., labeled 702A, 704B, etc.) are those for a buck-boost converter without enhanced power mode transitioning. As demonstrated by the transient analyses and waveforms depicted in FIG. 7, the regulator state variable disturbances (e.g., demonstrated by the voltage and current swings) that occur during the transitions between modes (e.g., at the dashed vertical lines 712, 714) for the buck-boost converter with enhanced power mode transitioning (e.g., 702B, 704B, 706B and 708B) are significantly smaller than the regulator state variable disturbances that occur during the transition between modes for the buck-boost converter without enhanced power mode transitioning (e.g., 702A, 704A, 706A and 708A).

Figure 8:
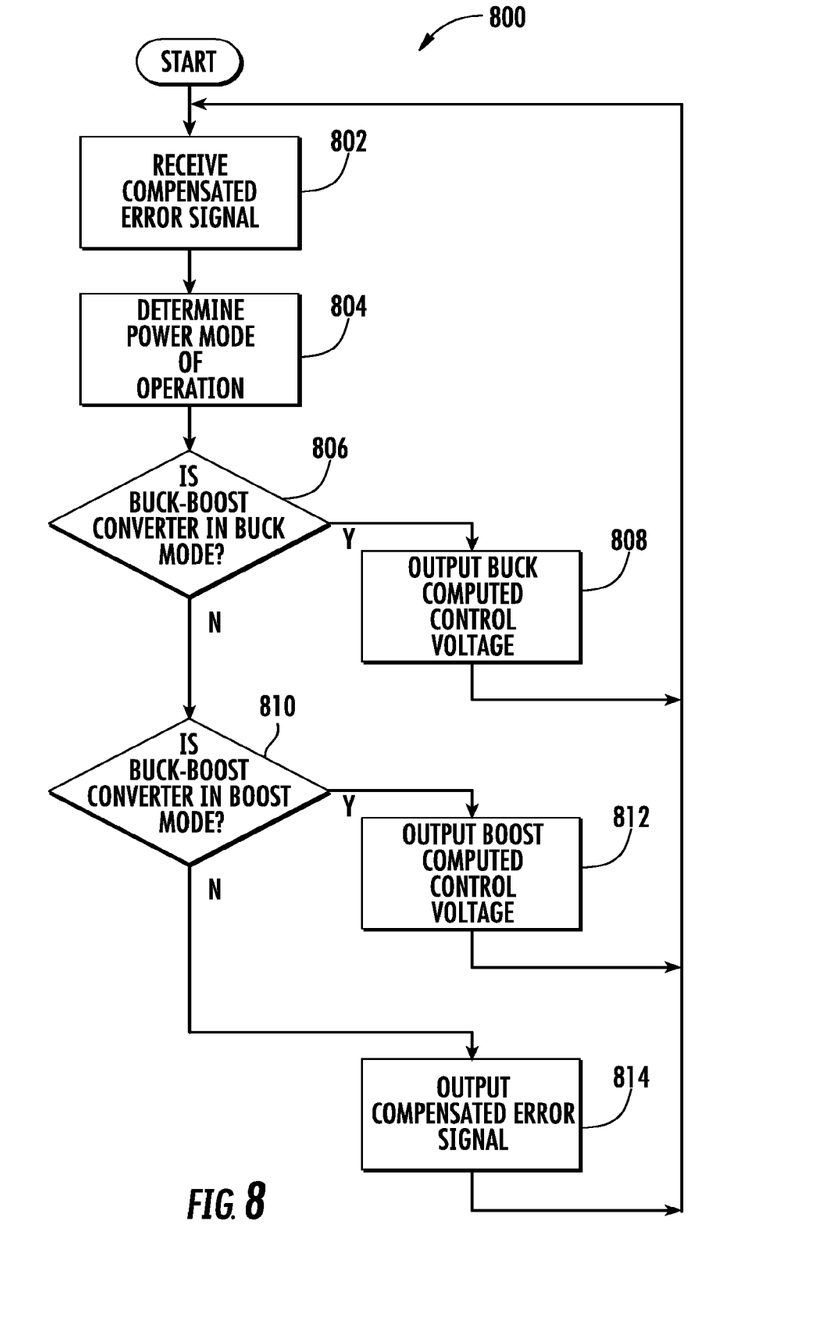
FIG. 8 depicts a flow diagram of a method that can be utilized to implement enhanced power mode transitioning in a buck-boost converter, in accordance with one exemplary embodiment of the present invention.

FIG. 8 depicts a flow diagram of a method 800, which can be utilized to implement enhanced power mode transitioning in a buck-boost converter, in accordance with one exemplary embodiment of the present invention. In this embodiment, the method 800 can be utilized to implement enhanced power mode transitioning in the buck-boost converter 100 depicted in FIG. 1. However, in other embodiments, the method 800 can be utilized to implement enhanced power mode transitioning in other types of DC-DC voltage converters, or regulators and controllers in which enhanced power mode transitioning is desired. Referring to FIGS. 1 and 8, the exemplary method 800 begins by receiving a compensated error signal (e.g., $V_C$) at the input to the variable gain circuit 108 (802). The power mode of operation of the buck-boost converter is then determined by the state of the control signal MODE 117 applied to the input to the multiplexer 116 (804). If the buck-boost converter is operating in the buck mode (806), the voltage signal output from the multiplexer 116 is the control signal, $V_C'$, which is output from the buck computation block 110 (808). The flow then proceeds to 802. However, at 806, if the buck-boost converter is not operating in the buck mode, then a determination is made (by the state of the control signal MODE 117) about whether or not the buck-boost converter is operating in the boost mode (810). If the buck-boost converter is operating in the boost mode, the voltage signal output from the multiplexer 116 is the control signal, $V_C'$, which is output from the boost computation block 114 (812). The flow then proceeds to 802. However, at 810, if the buck-boost converter is not operating in the boost mode, then the voltage signal output from the multiplexer 116 is the control signal, $V_C'$, which in this case, is the compensated error signal, $V_C$, that is output from the multiplexer 116 and the variable gain circuit 108 (814). The flow then proceeds to 802.

Figure 9:
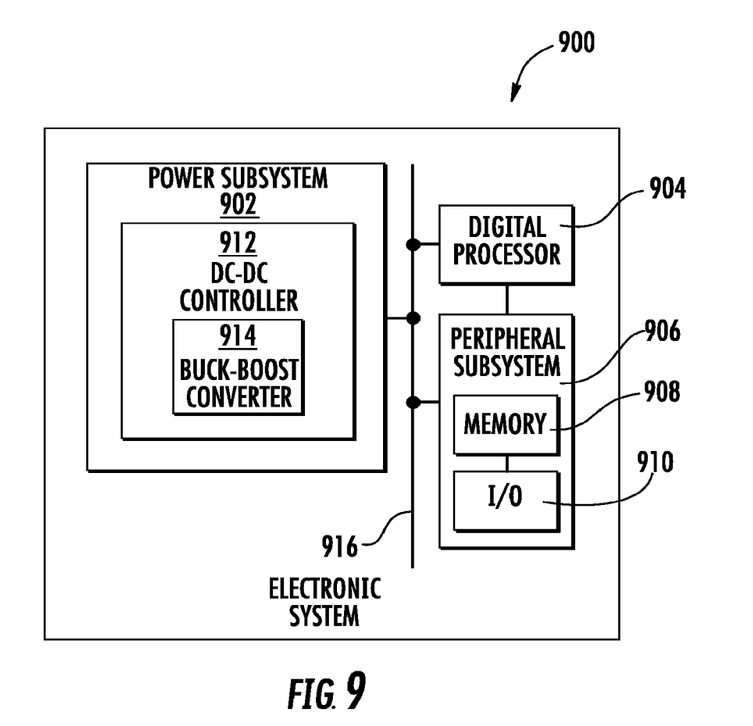
FIG. 9 is a schematic block diagram of an electronic system that can be utilized to implement one exemplary embodiment of the present invention.

FIG. 9 is a schematic block diagram of an electronic system 900, which can be utilized to implement enhanced power mode transitioning in a buck-boost converter, in accordance with one exemplary embodiment of the present invention. In the exemplary embodiment shown, electronic system 900 includes a power subsystem 902, a digital processor unit 904, and a peripheral subsystem 906. For example, the digital processor unit 904 can be a microprocessor or microcontroller and the like. The peripheral subsystem 906 includes a memory unit 908 for storing the data processed by the digital processor unit 904, and an input/output (I/O) unit 910 for transmitting and receiving the data to/from the memory unit 908 and the digital processor unit 904. In the exemplary embodiment depicted in FIG. 9, the power subsystem 902 includes a DC-DC controller 912, and a buck-boost converter with enhanced power mode transitioning circuit 914 for voltage and current regulation of the DC-DC controller 912. The DC-DC controller 912 and power subsystem 902 provide a regulated voltage via line 916 to power the electronic components in the digital processor unit 904 and peripheral subsystem 906. In the exemplary embodiment shown, the buck-boost converter with enhanced power mode transitioning circuit 914 can be implemented, for example, utilizing the buck-boost converter 100 depicted in FIG. 1. In one or more embodiments, the components of the electronic system 900 can be implemented in one or more integrated circuits, wafers, chips or dies.

EXAMPLE EMBODIMENTS

Example 1 includes a method for power mode transitioning in a DC-DC voltage converter, the method comprising: receiving a compensated error signal associated with an output voltage of the DC-DC voltage converter; determining a power mode of operation of the DC-DC voltage converter; if the power mode of operation is a first mode, outputting a first control signal based on the compensated error signal to regulate the output voltage of the DC-DC voltage converter; if the power mode of operation is a second mode, outputting a second control signal based on the compensated error signal to regulate the output voltage of the DC-DC voltage converter; and if the power mode of operation is a third mode, outputting a third control signal based on the compensated error signal to regulate the output voltage of the DC-DC voltage converter.

Example 2 includes the method of Example 1, wherein the determining if the power mode of operation is the first mode comprises determining if the power mode of operation is a buck mode.

Example 3 includes the method of any of Examples 1-2, wherein the determining if the power mode of operation is the second mode comprises determining if the power mode of operation is a boost mode.

Example 4 includes the method of any of Examples 1-3, wherein the determining if the power mode of operation is the third mode comprises determining if the power mode of operation is a buck-boost mode.

Example 5 includes the method of any of Examples 1-4, wherein the outputting the first control signal to regulate the output voltage of the DC-DC voltage converter comprises outputting a computed control voltage based on the compensated error signal for a buck mode of operation.

Example 6 includes the method of any of Examples 1-5, wherein the outputting the second control signal to regulate the output voltage of the DC-DC voltage converter comprises outputting a computed control voltage based on the compensated error signal for a boost mode of operation.

Example 7 includes the method of any of Examples 1-6, wherein the outputting the third control signal to regulate the output voltage of the DC-DC voltage converter comprises outputting a control voltage based on the compensated error signal for a buck-boost mode of operation.

Example 8 includes the method of any of Examples 1-7, wherein the outputting the third control signal to regulate the output voltage of the DC-DC voltage converter comprises outputting the compensated error signal for a buck-boost mode of operation.

Example 9 includes the method of any of Examples 1-8, wherein the DC-DC voltage converter comprises a buck-boost converter.

Example 10 includes a method of operating a buck-boost DC-DC converter, the method comprising: monitoring an output voltage of the buck-boost DC-DC converter; responsive to the monitoring, generating a compensated error voltage associated with the output voltage; modifying the compensated error voltage responsive to a power mode of operation of the buck-boost DC-DC converter; generating a Pulse Width Modulation (PWM) control signal responsive to the modified compensated error voltage; and controlling at least one of a boost power stage and a buck power stage of the buck-boost DC-DC converter responsive to the PWM control signal.

Example 11 includes the method of Example 10, wherein the monitoring comprises an error amplifier receiving the output voltage of the buck-boost DC-DC converter, and generating the compensated error voltage responsive to the output voltage.

Example 12 includes the method of any of Examples 10-11, wherein the modifying the compensated error voltage comprises a computation circuit computing a scaled value of the compensated error voltage responsive to the power mode of operation of the buck-boost DC-DC converter, and generating the modified compensated error voltage responsive to the computed scaled value of the compensated error voltage.

Example 13 includes the method of Example 12, wherein the computing the scaled value comprises determining a scaling factor of the computation circuit responsive to the power mode of operation of the buck-boost DC-DC converter.

Example 14 includes a DC-DC voltage converter, comprising: a buck power stage; a first switching transistor driver circuit coupled to the buck power stage; a boost power stage; a second switching transistor driver circuit coupled to the boost power stage; a logic circuit coupled to the first switching transistor driver circuit and the second switching transistor driver circuit; and a feedback circuit coupled to the logic circuit, wherein the feedback circuit modifies an error signal responsive to a transition between power modes.

Example 15 includes the DC-DC voltage converter of Example 14, wherein the feedback circuit includes: an error amplifier circuit coupled to the boost power stage, the error amplifier circuit configured to receive an output signal from the boost power stage and generate a compensated error signal associated with the output signal; a variable gain circuit coupled to the error amplifier circuit and configured to receive the compensated error signal, generate a modified compensated error signal for at least one power mode of operation of the DC-DC voltage converter, and output the modified compensated error signal for the at least one power mode of operation responsive to a transition between power modes; and a pulse-width-modulated (PWM) signal genera-tor circuit coupled to the variable gain circuit and configured to receive the modified compensated error signal responsive to the transition between power modes, and output a PWM signal, wherein the logic circuit is configured to receive the PWM signal and input and output voltages of the DC-DC voltage converter, and generate a first PWM signal to drive the buck power stage, a second PWM signal to drive the boost power stage, and a mode control signal.

Example 16 includes the DC-DC voltage converter of Example 15, wherein the error amplifier circuit comprises an operational transconductance amplifier.

Example 17 includes the DC-DC voltage converter of any of Examples 15-16, wherein the variable gain circuit comprises a buck computation block, a boost computation block, and a multiplexer coupled to the buck computation block, the boost computation block, and an output of the error amplifier circuit.

Example 18 includes the DC-DC voltage converter of any of Examples 15-17, wherein the PWM signal generator circuit comprises a modulator circuit configured to generate the PWM signal responsive to the modified compensated error signal for the at least one power mode of operation.

Example 19 includes the DC-DC voltage converter of any of Examples 15-18, wherein the logic circuit is configured to receive the input voltage of the DC-DC voltage converter, the output voltage of the DC-DC voltage converter and the PWM signal, output the mode control signal responsive to the input voltage and the output voltage, and output a first PWM signal to drive the buck power stage and a second PWM signal to drive the boost power stage.

Example 20 includes the DC-DC voltage converter of any of Examples 14-19, wherein the DC-DC voltage converter comprises a buck-boost converter formed on an integrated circuit, wafer, chip or die.

Example 21 includes the DC-DC voltage converter of any of Examples 14-20, wherein the DC-DC voltage converter comprises a voltage-mode controlled PWM controller.

Example 22 includes the DC-DC voltage converter of any of Examples 14-21, wherein the feedback circuit comprises: an error amplifier circuit coupled to the boost power stage, the error amplifier circuit configured to receive an output signal from the boost power stage and generate a compensated error signal associated with the output signal; a modulator amplifier circuit coupled to the error amplifier circuit and configured to receive the compensated error signal and generate a modified compensated error signal for at least one power mode of operation of the DC-DC voltage converter, and output the modified compensated error signal responsive to the transition between power modes; and a modulator circuit coupled to the modulator amplifier circuit and configured to receive the modified compensated error signal responsive to the transition between power modes, and output a PWM signal responsive to the modified compensated error signal.

Example 23 includes the DC-DC voltage converter of Example 22, wherein the transition between power modes comprises at least one of a transition to a buck-boost power mode of operation or a transition from a buck-boost power mode of operation.

Example 24 includes the DC-DC voltage converter of any of Examples 22-23, the modulator amplifier circuit further comprising at least one switchable gain circuit, wherein the at least one switchable gain circuit is configured to receive the compensated error signal and generate the modified compensated error signal responsive to a control signal associated with the transition between power modes.

Example 25 includes the DC-DC voltage converter of Example 24, wherein the at least one switchable gain circuit comprises a switch coupled to an input of the modulator amplifier circuit and configured to generate the modified compensated error signal responsive to the control signal associated with the transition between power modes.

Example 26 includes the DC-DC voltage converter of any of Examples 24-25, wherein the at least one switchable gain circuit comprises a multiplexer coupled to an output of the modulator amplifier circuit and configured to generate the modified compensated error signal responsive to the control signal associated with the transition between power modes.

Example 27 includes an electronic system, comprising: a digital processor; a peripheral subsystem coupled to the digital processor; and a power subsystem coupled to the digital processor and circuit components of the peripheral subsystem and configured to generate an output voltage to power the digital processor and the circuit components of the peripheral subsystem, wherein the power subsystem includes a DC-DC controller configured to regulate the output voltage of the power subsystem, and the DC-DC controller includes a buck-boost converter comprising: a buck power stage; a boost power stage; an error amplifier circuit coupled to the boost power stage, the error amplifier circuit configured to receive an output signal from the boost power stage and generate a compensated error signal associated with the output signal; a variable gain circuit coupled to the error amplifier circuit and configured to receive the compensated error signal, generate a modified compensated error signal for at least one power mode of operation of the buck-boost converter, and output the modified compensated error signal for the at least one power mode of operation responsive to a transition between power modes; a pulse-width-modulated (PWM) signal generator circuit coupled to the variable gain circuit and configured to receive the modified compensated error signal responsive to the transition between modes, and output a PWM signal; and a logic circuit coupled to the PWM signal generator circuit and configured to receive the PWM signal and the output voltage and an input voltage of the buck-boost converter, and generate a first PWM signal to drive the buck power stage, a second PWM signal to drive the boost power stage, and a mode control signal.

Example 28 includes the electronic system of Example 27, wherein the buck-boost converter and the power subsystem are formed on one or more integrated circuits, wafers, chips or dies.

Example 29 includes the electronic system of any of Examples 27-28, wherein the digital processor comprises a microprocessor or a microcontroller formed on an integrated circuit.

Example 30 includes the electronic system of any of Examples 27-29, wherein the power subsystem comprises a power management integrated circuit (PMIC).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the present application be limited only by the claims and the equivalents thereof.

What is claimed is:

1. A method of operating a buck-boost DC-DC converter, the method comprising:
    generating a compensated error voltage associated with an output voltage of the buck-boost DC-DC converter;
    performing a first modification of the compensated error voltage to produce a modified compensated error voltage during a first power mode of operation of the buck-boost DC-DC converter;
    performing a second modification of the compensated error voltage to produce the modified compensated error voltage during a second power mode of operation of the buck-boost DC-DC converter, wherein the first modification and the second modification are based on first and second different relationships between the output voltage and an input voltage of the buck-boost DC-DC converter; and
    controlling at least one of a boost power stage and a buck power stage of the buck-boost DC-DC converter responsive to the modified compensated error voltage and a signal representing an inductor current.

2. The method of claim 1, further comprising:
    monitoring the output voltage of the buck-boost DC-DC converter, wherein the generating the compensated error voltage is performed in response to the monitoring.

3. The method of claim 2, wherein the monitoring comprises an error amplifier receiving the output voltage of the buck-boost DC-DC converter, and generating the compensated error voltage responsive to the output voltage.

4. The method of claim 1, wherein the performing the first and second modifications comprises computing a scaled value of the compensated error voltage based on the first and second different relationships, respectively.

5. The method of claim 1, wherein controlling the at least one of the boost power stage and the buck power stage of the buck-boost DC-DC converter includes generating a Pulse Width Modulation (PWM) control signal responsive to the modified compensated error voltage.

6. The method of claim 5, wherein the PWM control signal has a duty cycle depending on the modified compensated error voltage.

7. The method of claim 1, wherein the first power mode of operation of the buck-boost DC-DC converter is a first one of a buck mode, a boost mode and a buck-boost mode, and wherein the second power mode of operation of the buck-boost DC-DC converter is a second different one of the buck mode, the boost mode and the buck-boost mode.

8. A DC-DC voltage converter, comprising:
    a buck power stage;
    a first switching transistor driver circuit coupled to the buck power stage;
    a boost power stage;
    a second switching transistor driver circuit coupled to the boost power stage;
    a logic circuit coupled to the first switching transistor driver circuit and the second switching transistor driver circuit; and
    a feedback circuit coupled to the logic circuit, wherein the feedback circuit performs a first modification of an error signal during a first power mode of operation of the DC-DC voltage converter, and wherein the feedback circuit performs a second modification of the error signal during a second power mode of operation of the DC-DC voltage converter, wherein the first modification and the second modification are based on first and second different relationships between an output voltage and an input voltage of the DC-DC voltage converter; and controlling at least one of the boost power stage and the buck power stage of the DC-DC voltage converter responsive to the modified error signal and a signal representing an inductor current.

9. The DC-DC voltage converter of claim 8, wherein the feedback circuit includes:
an error amplifier circuit coupled to the boost power stage, the error amplifier circuit configured to receive an output signal from the boost power stage and generate a compensated error signal associated with the output signal;
a variable gain circuit coupled to the error amplifier circuit and configured to receive the compensated error signal, generate a modified compensated error signal for the first and second power modes of operation of the DC-DC voltage converter, and output the modified compensated error signal for one of the first and second power modes of operation responsive to a transition between power modes; and
a pulse-width-modulated (PWM) signal generator circuit coupled to the variable gain circuit and configured to receive the modified compensated error signal, and output a PWM signal, wherein the logic circuit is configured to receive the PWM signal and the input and output voltages of the DC-DC voltage converter, and generate a first PWM signal to drive the buck power stage, a second PWM signal to drive the boost power stage, and a mode control signal.

10. The DC-DC voltage converter of claim 9, wherein the error amplifier circuit comprises an operational transconductance amplifier.

11. The DC-DC voltage converter of claim 9, wherein the variable gain circuit comprises a buck computation block, a boost computation block, and a multiplexer coupled to the buck computation block, the boost computation block, and an output of the error amplifier circuit.

12. The DC-DC voltage converter of claim 9, wherein the PWM signal generator circuit comprises a modulator circuit configured to generate the PWM signal responsive to the modified compensated error signal for the first and second power modes of operation.

13. The DC-DC voltage converter of claim 9, wherein the logic circuit is configured to receive the input voltage of the DC-DC voltage converter, the output voltage of the DC-DC voltage converter and the PWM signal, output the mode control signal responsive to the input voltage and the output voltage, and output a first PWM signal to drive the buck power stage and a second PWM signal to drive the boost power stage.

14. The DC-DC voltage converter of claim 8, wherein the feedback circuit comprises:
an error amplifier circuit coupled to the boost power stage, the error amplifier circuit configured to receive an output signal from the boost power stage and generate a compensated error signal associated with the output signal;
a modulator amplifier circuit coupled to the error amplifier circuit and configured to receive the compensated error signal and generate a modified compensated error signal for the first and second power modes of operation of the DC-DC voltage converter, and output the modified compensated error signal for one of the first and second power modes responsive to a transition between power modes; and
a modulator circuit coupled to the modulator amplifier circuit and configured to receive the modified compensated error signal, and output a PWM signal responsive to the modified compensated error signal.

15. The DC-DC voltage converter of claim 14, wherein the transition between power modes comprises at least one of a transition to a buck-boost power mode of operation or a transition from a buck-boost power mode of operation.

16. The DC-DC voltage converter of claim 14, the modulator amplifier circuit further comprising at least one switchable gain circuit, wherein the at least one switchable gain circuit is configured to receive the compensated error signal and generate the modified compensated error signal responsive to a control signal associated with the transition between power modes.

17. The DC-DC voltage converter of claim 16, wherein the at least one switchable gain circuit comprises a switch coupled to an input of the modulator amplifier circuit and configured to generate the modified compensated error signal responsive to the control signal associated with the transition between power modes.

18. The DC-DC voltage converter of claim 16, wherein the at least one switchable gain circuit comprises a multiplexer coupled to an output of the modulator amplifier circuit and configured to generate the modified compensated error signal responsive to the control signal associated with the transition between power modes.

* * * * *